(12) United States Patent
Alali et al.

(10) Patent No.: US 11,821,307 B2
(45) Date of Patent: Nov. 21, 2023

(54) 1D MONO FREQUENCY RATIO LOG EXTRACTION WORKFLOW PROCEDURE FROM SEISMIC ATTRIBUTE DEPTH VOLUME

(71) Applicant: SAUDI ARABIAN OIL COMPANY, Dhahran (SA)

(72) Inventors: Amin Z. Alali, Al Mallahah (SA); Taher M. Sodagar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 177 days.

(21) Appl. No.: 17/495,459

(22) Filed: Oct. 6, 2021

(65) Prior Publication Data
US 2023/0103762 A1 Apr. 6, 2023

(51) Int. Cl.
*E21B 49/00* (2006.01)
*G01V 1/34* (2006.01)
*G01V 1/30* (2006.01)

(52) U.S. Cl.
CPC .............. *E21B 49/00* (2013.01); *G01V 1/307* (2013.01); *G01V 1/345* (2013.01); *E21B 2200/20* (2020.05)

(58) Field of Classification Search
CPC ....... E21B 49/00; E21B 2200/20; G01V 1/28; G01V 1/301; G01V 1/303; G01V 1/305; G01V 1/306; G01V 1/307; G01V 1/308; G01V 1/345; G01V 1/364; G01V 2210/43; G01V 2210/48; G01V 2210/677
See application file for complete search history.

(56) References Cited

U.S. PATENT DOCUMENTS

| 5,444,619 A | * | 8/1995 | Hoskins | G01V 1/306 702/14 |
| 5,812,493 A | * | 9/1998 | Robein | G01V 1/48 702/14 |
| 8,185,316 B2 | | 5/2012 | Alam et al. | |

(Continued)

FOREIGN PATENT DOCUMENTS

CN 106443786 B 4/2018

OTHER PUBLICATIONS

Artun, F. Emre, "Reservoir Characterization Using Intelligent Seismic Inversion", Graduate Theses, Dissertations, and Problem Reports, West Virginia University, 1620, 2005 (95 pages).

(Continued)

*Primary Examiner* — Kenneth L Thompson
(74) *Attorney, Agent, or Firm* — Osha Bergman Watanabe & Burton LLP

(57) ABSTRACT

Methods and systems for determining a spectral ratio log using a time domain seismic image and a seismic velocity model are disclosed. The method includes determining a first mono-spectral seismic image and a second mono-spectral seismic image from the time domain seismic image. The method further includes determining a time domain spectral ratio image from the first mono-spectral seismic image and the second mono-spectral seismic image and transforming the time domain spectral ratio image into a depth domain spectral ratio image using the seismic velocity model. The method still further includes defining a wellbore path through the depth domain spectral ratio image and determining a spectral ratio log along the wellbore path from the depth domain spectral ratio.

20 Claims, 8 Drawing Sheets

(56) References Cited

U.S. PATENT DOCUMENTS

| | | | |
|---|---|---|---|
| 8,213,261 | B2 | 7/2012 | Imhof et al. |
| 8,649,980 | B2 | 2/2014 | Gulati |
| 8,902,709 | B2 | 12/2014 | Jaiswal et al. |
| 9,008,972 | B2 | 4/2015 | Imhof et al. |
| 9,182,510 | B2* | 11/2015 | Langenwalter .......... G01V 1/28 |
| 9,523,784 | B2 | 12/2016 | Orban |
| 10,295,683 | B2 | 5/2019 | Du et al. |
| 10,444,388 | B2* | 10/2019 | Dusterhoft ............. G01V 1/301 |
| 10,670,758 | B2* | 6/2020 | Khalil .................... G01V 1/364 |
| 11,521,122 | B2* | 12/2022 | Liu ........................ G06N 20/00 |
| 11,644,591 | B1* | 5/2023 | Wang .................... G01V 1/282 |
| | | | 702/2 |
| 2013/0151161 | A1 | 6/2013 | Imhof et al. |
| 2015/0168574 | A1 | 6/2015 | Wallet et al. |
| 2019/0383965 | A1 | 12/2019 | Salman et al. |
| 2020/0033505 | A1* | 1/2020 | Nyrnes ............... G01V 99/005 |
| 2021/0165119 | A1 | 6/2021 | Xia |
| 2022/0237891 | A1* | 7/2022 | Xu .......................... G01V 3/02 |

OTHER PUBLICATIONS

Chen, Ganglin, et al., "Spectral-decomposition response to reservoir fluids from a deepwater West Africa reservoir", Geophysics, Society of Exploration Geophysicists, vol. 73, No. 6, Nov.-Dec. 2008, pp. C23-C30 (8 pages).

Operto, S., et al., "Efficient 3-D frequency-domain mono-parameter full-waveform inversion of ocean-bottom cable data: application to Valhall in the visco-acoustic vertical transverse isotropic approximation", Geophysical Journal International, vol. 202, 2015, pp. 1362-1391 (30 pages).

Sodagar, Taher M., "Revelation of the Triassic Gas Potential with Insight of Iso Frequency Spectral Decomposition in Saudi Arabia's Offshore", SPE-172625-MS, Society of Petroleum Engineers, Mar. 2015, pp. 1-16 (16 pages).

Wang, Yanghua, "Seismic time-frequency spectral decomposition by matching pursuit", Geophysics, Society of Exploration Geophysicists, vol. 72, No. 1, Jan.-Feb. 2007, pp. V13-V20 (8 pages).

* cited by examiner

1D MONO FREQUENCY RATIO LOG EXTRACTION WORKFLOW PROCEDURE FROM SEISMIC ATTRIBUTE DEPTH VOLUME

BACKGROUND

In the oil and gas industry it is often valuable to predict a well log prior to drilling a wellbore based on data already available from geological models, neighboring wells, or from surface geophysical surveying methods. Such predicted well logs may then be used during drilling of a wellbore. For example, they may be used to anticipate drilling problems, steer deviated wells, inform completion decisions and plan hydraulic fracturing operation.

The presence of gas in the pores of a geological formation are known to affect the attenuation of acoustic waves, whether at seismic or sonic frequencies. Attenuation is known to affect the amplitude of high frequency acoustic waves more than the amplitude of low frequency acoustic waves. Thus, the ratio of high frequency amplitude to low frequency amplitude acoustic waves may be regarded as an attribute that indicates the presence of gas in a hydrocarbon reservoir.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining a spectral ratio log using a time domain seismic image and a seismic velocity model. The method includes determining a first mono-spectral seismic image and a second mono-spectral seismic image from the time domain seismic image. The method further includes determining a time domain spectral ratio image from the first mono-spectral seismic image and the second mono-spectral seismic image and transforming the time domain spectral ratio image into a depth domain spectral ratio image using the seismic velocity model. The method still further includes defining a wellbore path through the depth domain spectral ratio image and determining a spectral ratio log along the wellbore path from the depth domain spectral ratio.

In general, in one aspect, embodiments relate to a non-transitory computer readable medium storing instructions executable by a computer processor. The instructions include functionality to receive a time domain seismic image and a seismic velocity model. The instructions include determining a first mono-spectral seismic image and a second mono-spectral seismic image from the time domain seismic image. The instructions further include determining a time domain spectral ratio image from the first mono-spectral seismic image and the second mono-spectral seismic image and transforming a time domain spectral ratio image into a depth domain spectral ratio image using the seismic velocity model. The instructions still further include defining a wellbore path through the depth domain spectral ratio image and extracting a spectral ratio log from the depth domain spectral ratio image along the wellbore path.

In general, in one aspect, embodiments relate to a system including a seismic acquisition system to acquire a seismic dataset and a seismic processor configured receive the seismic dataset and determine a seismic velocity model. The seismic processor is configured to generate a time domain seismic image from the seismic dataset, determine a first mono-spectral seismic image and a second mono-spectral seismic image from the seismic image, and determine a spectral ratio image based, at least in part, on the first mono-spectral seismic image and the second mono-spectral seismic image. The seismic processor is configured to transform the spectral ratio image from the time domain to the depth domain based, at least in part, on the seismic velocity model, determine a wellbore path through the depth domain spectral ratio image, and extract a spectral ratio log along the wellbore path from the depth domain spectral ratio image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
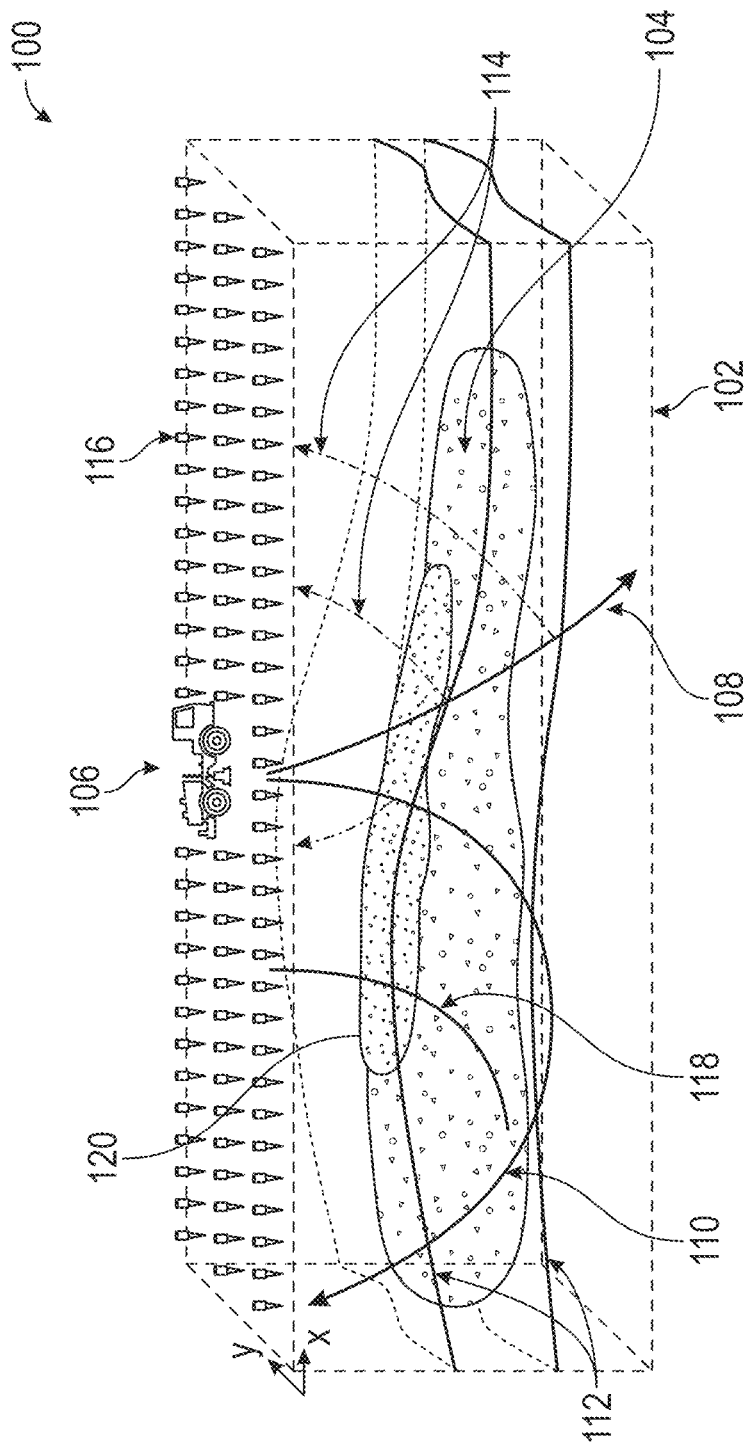
FIG. 1 depicts a seismic survey in accordance with one or more embodiments.

FIG. 1 shows a seismic survey (100) of a subterranean region of interest (102), which may contain a gas deposit (120) that may form part of a hydrocarbon reservoir (104). The gas may be methane, ethane, or another hydrocarbon gas. The seismic survey (100) may utilize a seismic source (106) that generates radiated seismic waves (108). The radiated seismic waves (108) may return to the surface as refracted seismic waves (110) or reflected seismic waves (114). Reflected seismic waves (114) occur due to geological discontinuities (112). At the surface, refracted seismic waves (110) and reflected seismic waves (114) may be detected by seismic receivers (116).

In some embodiments, the refracted seismic waves (110) and reflected seismic waves (114) generated by a single activation of the seismic source (106) are recorded by a seismic receiver (116) as a time-series representing the amplitude of ground-motion at a sequence of discrete times. This time-series may be denoted a seismic "trace". A seismic source (106) may be positioned at a location denoted ($x_s$, $y_s$) where x and y represent orthogonal axes on the earth's surface above the subterranean region of interest (102). The seismic receivers (116) are positioned at a plurality of seismic receiver locations denoted ($x_r$, $y_r$). Thus, the refracted seismic waves (110) and reflected seismic waves (114) generated by a single activation of the seismic source (106) may be represented in five-dimensional space with axes ($x_s$, $y_s$, $x_r$, $y_r$, t) where t delimits the time sample at which the amplitude of ground-motion was measured by a seismic receiver (116). If a seismic survey (100) indicates the subterranean region of interest (102) to be rich in hydrocarbons, a wellbore (118) may be drilled to access those hydrocarbons.

Figure 2:
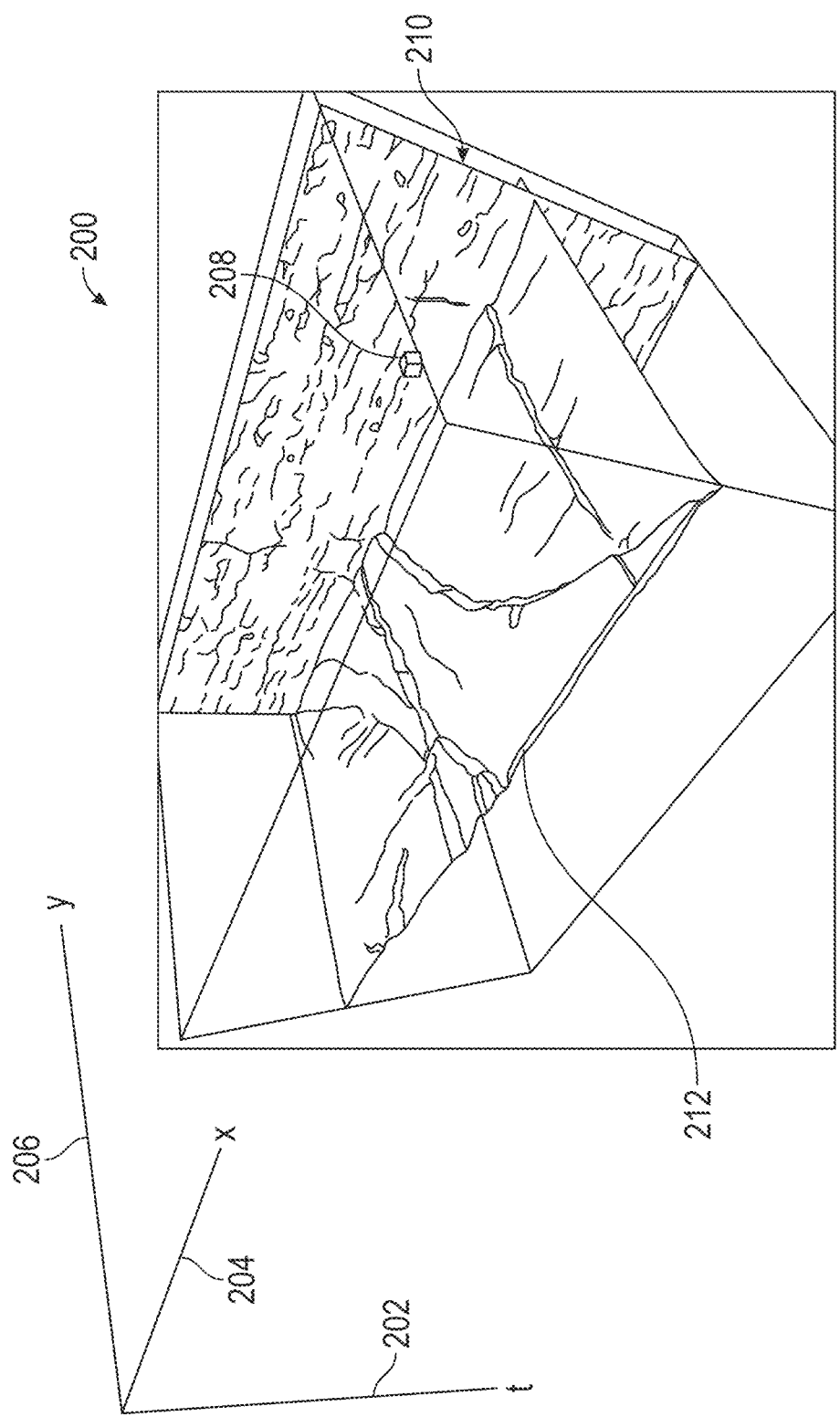
FIG. 2 shows a time domain seismic image in accordance with one or more embodiments.

FIG. 2 shows a time domain seismic image (200) in accordance with one or more embodiments. Seismic processing may reduce five-dimensional seismic data produced by a seismic survey (100) to a time domain seismic image with one time dimension (202), a first spatial dimension (204), and a second spatial dimension (206), where the first spatial dimension (204) and second spatial dimension (206) are orthogonal and span the Earth's surface above the subterranean region of interest (102). Seismic processing performs this reduction from five-dimensional seismic space to a time domain seismic image by correcting the recorded time of seismic waves for the time of travel from the seismic source (106) to the seismic receiver (116) and summing ("stacking") samples over two horizontal space dimensions.

FIG. 2 depicts 2D slices through a three-dimensional ("3D") time domain seismic image. A 3D pixel or voxel (208) of the time domain seismic image (200) may represent an estimated attribute of the subterranean region of interest (102) at the position of the voxel. For example, the attribute may be, without limitation, a seismic wave reflection amplitude, a mono-spectral amplitude, or a coherence value. FIG. 2 shows a 2D vertical slice (210) and a 2D horizontal slice (212) through the time domain seismic image (200).

Processing a seismic survey (100) to obtain a time domain seismic image (200) requires each step in the processing chain, such as correcting for heterogeneities near the seismic source and seismic receivers, correcting for geometrical spreading of the wavefield, attenuating noise, and attenuating seismic multiples, be performed in a manner which does not distort the amplitude of the seismic signal. In particular, the generation of nulls in the seismic signal spectrum and angular variation in the radiation pattern by the processing algorithms must be avoided.

Figure 3:
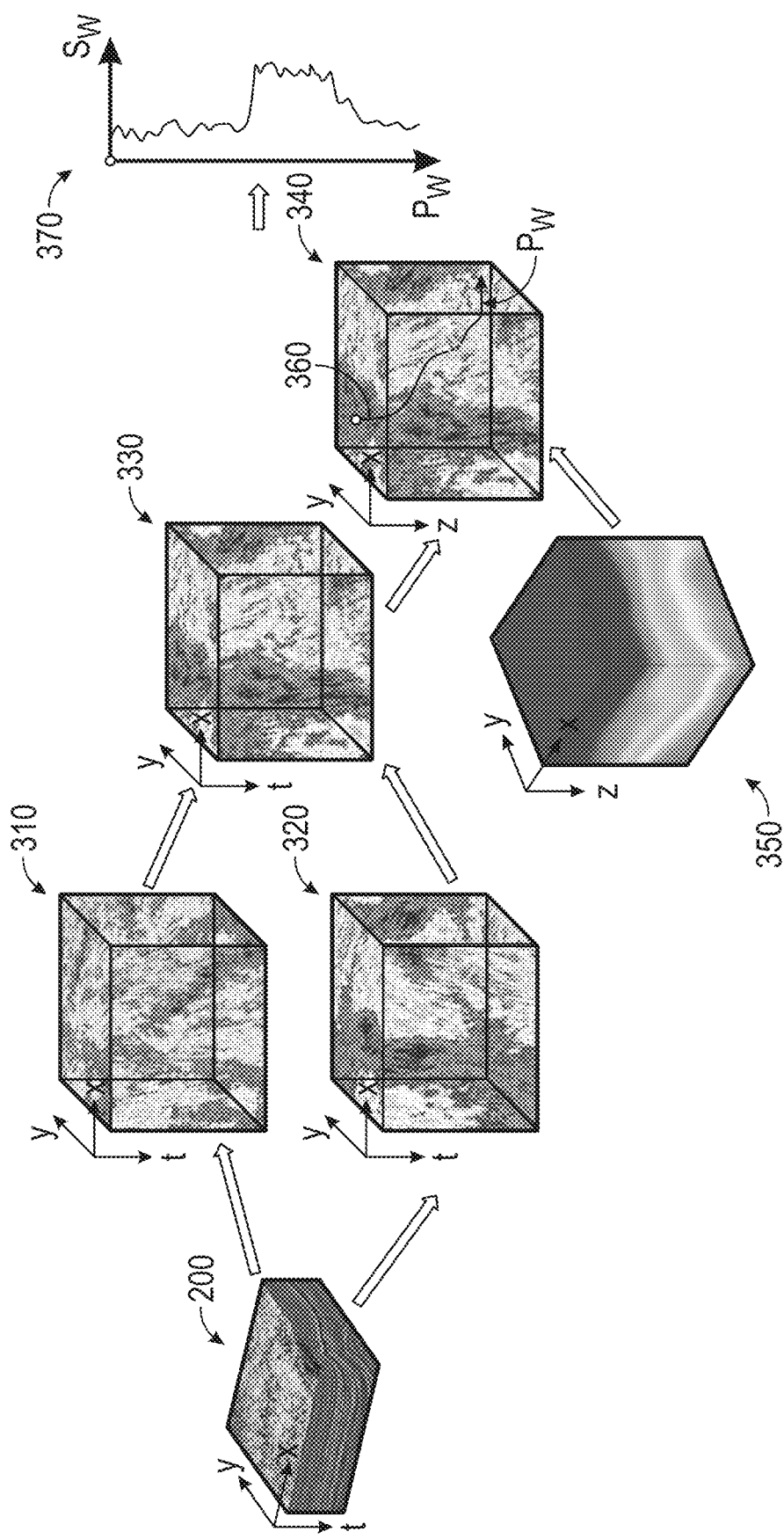
FIG. 3 depicts a method for finding the location of gas along a wellbore path using pictorials in accordance with one or more embodiments.

FIG. 3 depicts a method for finding the location of gas along a wellbore path (360) in accordance with one or more embodiments. The time domain seismic image (200) may be the time domain seismic image (200) shown in FIG. 2.

Mono-spectral seismic images (310, 320) may be calculated by applying spectral decomposition to the time domain seismic image (200). According to some embodiments, a mono-spectral seismic image (310, 320) represents an amplitude of a single frequency component of the time domain signal at each spatial position in 2D space and time. According to other embodiments, the mono-spectral seismic image (310, 320) may represent an average amplitude over a narrow window of frequencies.

The spectral decomposition of the time domain seismic image (200) may be determined by dividing each seismic trace into a plurality of segments using a sliding time-window and transforming each segment from the time domain to the frequency domain. According to some embodiments, spectral decomposition may be performed using a short-time discrete Fourier transform, such as a Gabor transform or S transform, the continuous wavelet transform, or the Wigner distribution function along the time axis of a time domain seismic image (200). Other methods of spectrally decomposing the time domain seismic image (200) into a mono-spectral seismic image (310, 320) may be apparent to one skilled in the art.

In other embodiments, the voxel value in a mono-spectral seismic image (310, 320) may be calculated from a plurality of voxel values in the time domain seismic image (200). Statistical functions including, without limitation, the mean, mode, and maximum may be applied to the plurality of voxel values in the time domain seismic image (200) to determine the voxel value in a mono-spectral seismic image (310, 320).

Two mono-spectral seismic images (310, 320) may be combined to determine a time domain spectral ratio image (330). In accordance with one or more embodiments, the voxel value in the time domain spectral ratio image (330) is calculated as the ratio of the value of a voxel in the first mono-spectral seismic image (310) and the value of a voxel in the second mono-spectral seismic image (320). The voxel in the second mono-spectral seismic image (320) may occupy the same 3D space as the voxel in the first mono-spectral seismic image (310) when calculating the time domain spectral ratio image (330).

In other embodiments, the value of each voxel in the time domain spectral ratio image (330) may be calculated from a plurality of voxel values in the first mono-spectral seismic image (310), or a plurality of voxel values in the second mono-spectral seismic image (320), or both. The plurality of voxels in the second mono-spectral seismic image (320) may occupy the same 3D space as the plurality of voxels in the first mono-spectral seismic image (310) when calculating the time domain spectral ratio image (330). Further, statistical functions that include but are not limited to the mean, mode, or maximum applied to the plurality of voxel values in the mono-spectral seismic images (310, 320) could be used to calculate the voxel value in the time domain spectral ratio image (330).

The time domain spectral ratio image $S_T(x, y, t)$ (330) may be transformed into a depth domain spectral ratio image $S_Z(x, y, z)$ (340) using a seismic velocity model $v(x, y, z)$ (350). For example, the time, $t(x, y, z)$, corresponding to any position in the seismic velocity model (350) may be calculated by:

$$t(x, y, z) = 2\int_0^z dz'/v(x,y,z') \qquad \text{Equation (1)}$$

and the depth domain spectral ratio image $S_Z(x, y, z)$ (340) may be determined by:

$$S_X(x, y, z) = S_T(x, y, t(x, y, z)). \qquad \text{Equation (2)}$$

In accordance with one or more embodiments, Equation (1) may be replaced by a discretized seismic velocity model (350) with a velocity value at each voxel's location in 3D space. Further, the integration in Equation (1) may be replaced by a summation. Each voxel value in the depth domain spectral ratio image (340) may be calculated from a plurality of voxel values in the time domain spectral ratio image (330).

A wellbore path (360) of a wellbore (118) may be denoted $P_Z=(x_w, y_w, z_w)$ and exists in 3D depth domain space. In some embodiments, the wellbore path (360) may be the path of a proposed wellbore that has not been drilled. In other embodiments, the wellbore path may be the path of a wellbore that has already been drilled.

A spectral ratio log, $S_w$, (370) for a wellbore path (360) may be determined from a depth domain spectral ratio image, $S_Z(x, y, z)$, where:

$$S_w = S_Z(P_Z) \quad \text{Equation (3)}.$$

In one or more embodiments, determining the spectral ratio log (370) may require interpolation between a plurality of voxels of the depth domain spectral ratio image (340), $S_Z(x, y, z)$, surrounding the location of a point on the wellbore path, $(x_w, y_w, z_w)$. In other embodiments, for each depth sample in the spectral ratio log (370), the value of the voxel in the spectral ratio image (330) closest in space to a point on the wellbore path (360) may be selected without interpolation.

In some embodiments, the time domain seismic image (200), mono-spectral seismic images (310, 320), time domain spectral ratio image (330), depth domain spectral ratio image (340), and the seismic velocity model (350) may be displayed as a plurality of voxels or pixels of varying colors, hues, or saturations. In other embodiments, a grayscale representing the values of the attribute within the voxel may be used, with or without contour lines or surfaces connecting voxels with equal attribute values.

In accordance with one or mode embodiments, filters may be used in determining the time domain seismic image (200), mono-spectral seismic images (310, 320), time domain spectral ratio image (330), depth domain spectral ratio image (340), seismic velocity model (350), and depth domain spectral ratio log (370). The filters may be spatial filters, such as spatial-smoothing filters, dip-guided filters, structure-oriented filters, deterministic filters, and statistical filters. The purpose of such filters may include, without limitation, a reduction or removal of noise spikes, removal of outliers, the increase in spatial smoothness, or any combination of these purposes.

Figure 4:
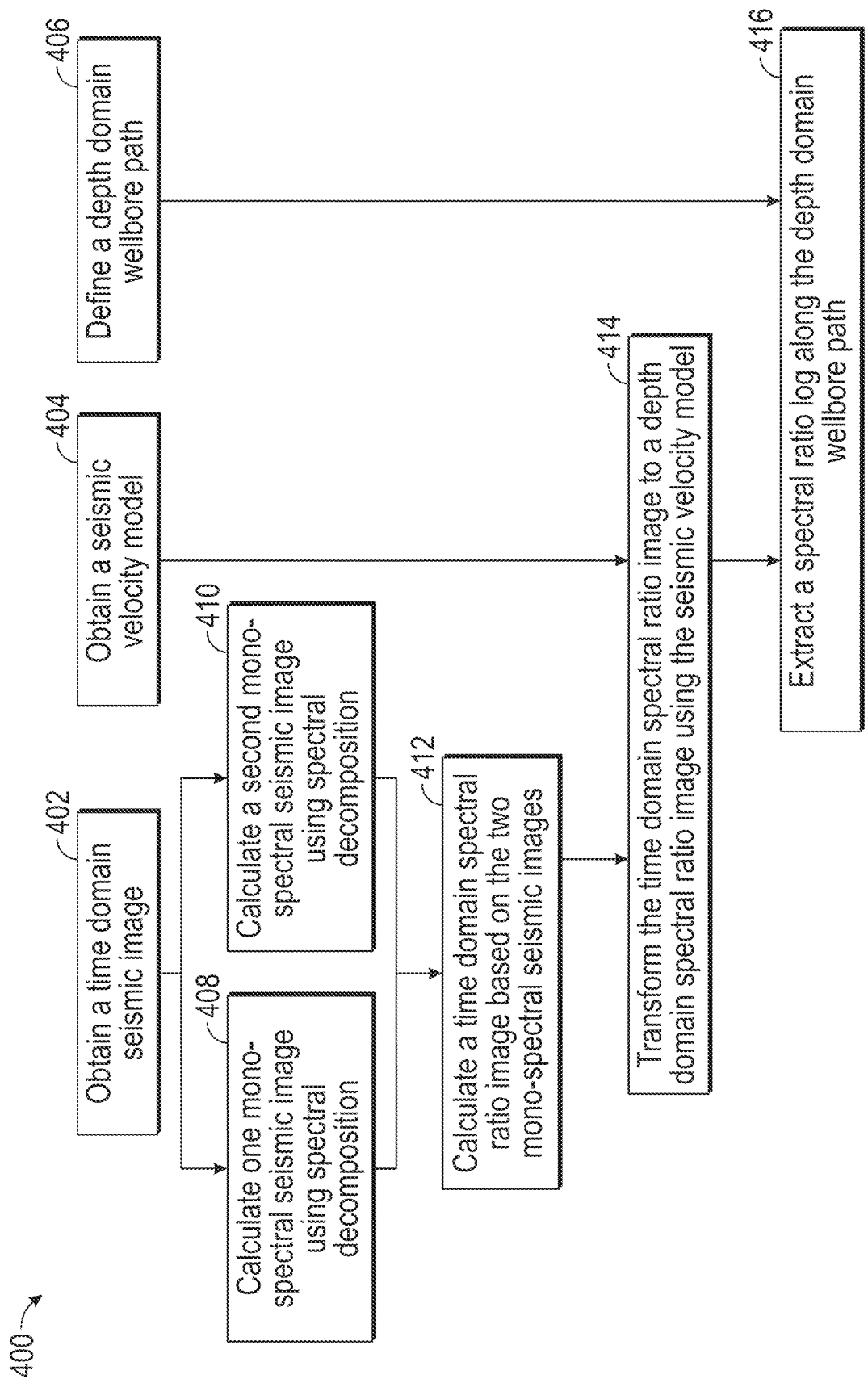
FIG. 4 shows a flowchart for finding the location of gas along a wellbore path in accordance with one or more embodiments.

FIG. 4 shows a flowchart (400) in accordance with one or more embodiments. In Step 402, a time domain seismic image (200) may be obtained. The time domain seismic image (200) may be determined from a seismic dataset acquired using a seismic survey (100) above a subterranean region of interest (102). The seismic dataset may be processed to attenuate noise and stack seismic traces to produce a time domain seismic image (200) in a 3D space defined by two orthogonal spatial dimensions (204, 206) and a recording time dimension (202).

In Step 404, in accordance with one or more embodiments, a seismic velocity model (350) for the subterranean region of interest (102) is obtained. The seismic velocity model (350) provides an estimate of at least one seismic wave propagation velocity at each location in the depth domain within the subterranean region of interest (102). Typically, a seismic velocity model (350) is specified by at least one seismic velocity for a particular wave type at a plurality of discrete grid points spanning the subsurface region of interest, but other specifications are possible. For example, the seismic velocity model (350) may be defined by a plurality of continuously varying mathematical functions.

In Step 406, a wellbore path (360) may be obtained, in accordance with one or more embodiments. The wellbore path (360) may be the path of a virtual well that has not been drilled but may be drilled in the future or may be the path of an actual well that has been drilled. The wellbore path (360) is defined in a 3D space defined by two orthogonal surface dimensions and depth.

In Step 408, a first mono-spectral seismic image (310) with a first frequency may be determined from the time domain seismic image (200) using spectral decomposition. The mono-spectral seismic image provides an estimate of the amplitude of the first frequency component, or a small window of frequencies surrounding the first frequency component, of the time domain seismic image (200) for each point in horizontal space and recording time.

In Step 410, a second mono-spectral seismic image (320) with a second frequency may be determined from the time domain seismic image (200) using spectral decomposition. In accordance with one or more embodiments, the frequency of the first frequency and the second frequency are different. In some embodiments, the first frequency is smaller than the second frequency. In other embodiments, the first frequency is larger than the second frequency. For example, the first frequency may be 10 Hertz and the second frequency may be 40 Hertz.

In Step 412, in accordance with one or more embodiments, a time domain spectral ratio image (330) may be determined based, at least in part, on the first and second mono-spectral seismic images (310, 320). In some embodiments, the first mono-spectral seismic image (310) may be divided, on a voxel-by-voxel basis, by the second mono-spectral seismic image (320). In other embodiments, the second mono-spectral seismic image (320) may be divided by the first mono-spectral seismic image (310). In some embodiments, a positive number may be added to the denominator prior to division to prevent instabilities arising from a division by zero. The positive number may be small in comparison to an average value of the first mono-spectral seismic image (310) or in comparison to an average value of the second mono-spectral seismic image (320).

In Step 414, the time domain spectral ratio image (330) may be transformed into a depth domain spectral ratio image (340) using the seismic velocity model (350). In some embodiments, integration or summation of the reciprocal of the seismic velocity values in the seismic velocity model (350) from the surface to a plurality of depths may be performed to convert the frequency amplitudes in the spectral ratio image from the time domain to the depth domain.

In Step 416, a depth domain spectral ratio log (370) may be extracted from a depth domain spectral ratio image (340) along a depth domain wellbore path (360). In some embodiments, a depth domain wellbore path (360) may lie in 3D space or may lie in a 2D plane as a 2D projection of the 3D wellbore path.

Figure 5:
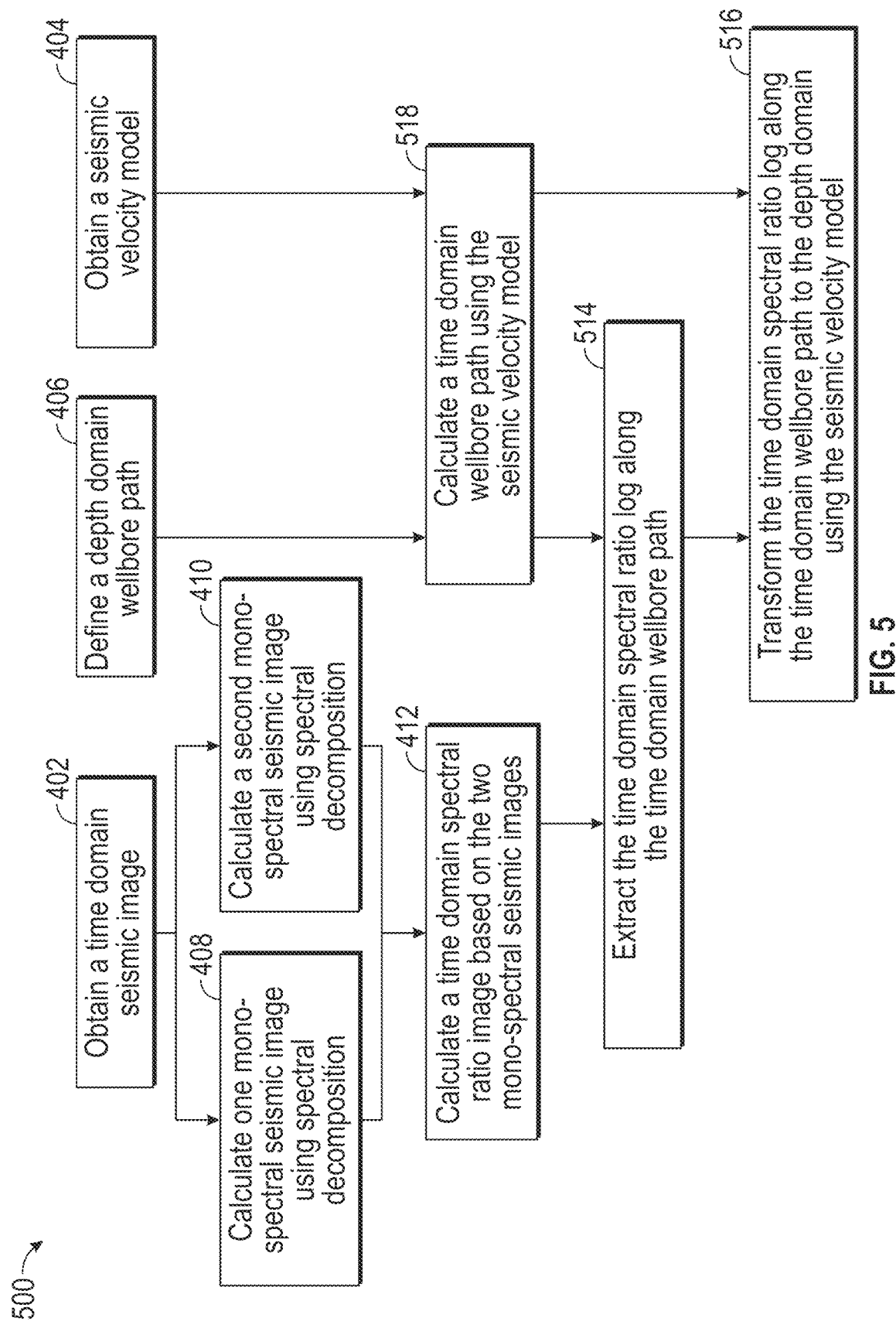
FIG. 5 shows a flowchart for finding the location of gas along a wellbore path in accordance with other embodiments.

FIG. 5 shows a flowchart (500) in accordance with one or more embodiments. Flowchart (500) depicts an alternative embodiment to the embodiment depicted in flowchart (400). Steps 402, 404, 406, 408, 410, and 412 may be common to both flowchart (400) and flowchart (500). In Step 518, a depth domain wellbore path, $P_X=(x_w, y_w, z_w)$, (360) may be transformed into a time domain wellbore path, $P_T=(x_w, y_w, t_w)$, using the seismic velocity model (350). For example, in accordance with one or more embodiments, the depth, $z_w$, associated with each point, $(x_w, y_w, t_w)$, on the time domain wellbore path may be determined by:

$$z_w(x_w, y_w, t_w) = \tfrac{1}{2}\int_0^{t_w} v(x_w, y_w, t')dt'. \quad \text{Equation (4)}$$

In Step 514, a time domain spectral ratio log may be extracted from a time domain spectral ratio image (330) along a time domain wellbore path. In some embodiments, a time domain wellbore path may lie in 3D space or may lie in a 2D plane as a 2D projection of the 3D wellbore path.

In Step 516, a time domain spectral ratio log may be transformed into a depth domain spectral ratio log (370) using the seismic velocity model (350). In some embodiments, integration or summation of the seismic velocity model (350) may be performed along the depth of the wellbore path (118) to convert the frequency amplitudes in the spectral ratio log from time to depth.

Figure 6B:
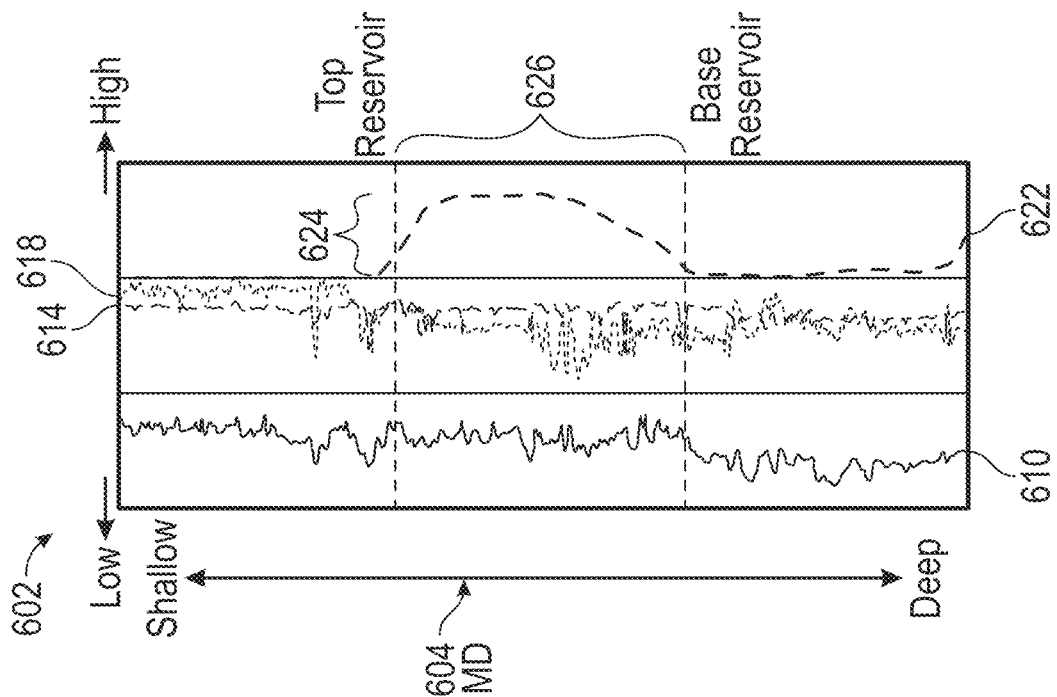
FIGS. 6A and 6B show the location of gas using depth domain spectral ratio logs along two wellbore paths in accordance with one or more embodiments.
Figure 6A:
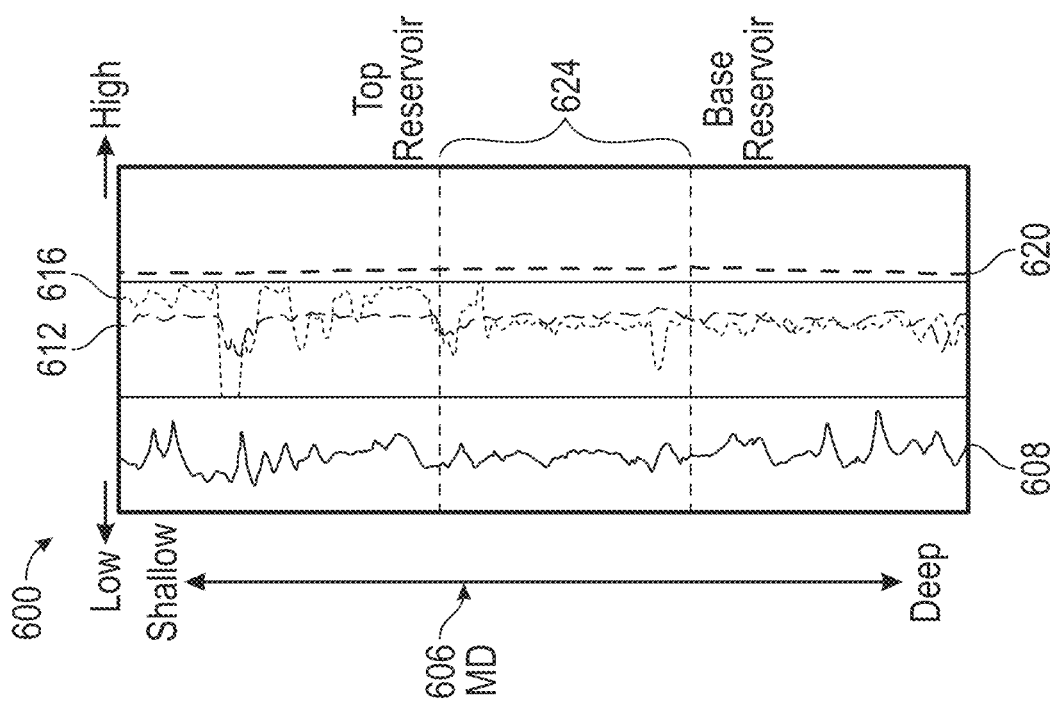

FIG. 6A shows a depth domain spectral ratio log along a portion of a drilled non-producing gas well (600) and FIG. 6B shows a depth domain spectral ratio log along a portion of a drilled producing gas well (602) in accordance with one or more embodiments. The ordinate represents the distance along a wellbore path (360), often called measured depth and denoted MD (604, 606). In addition, a plurality of logs that may indicate the presence of gas are displayed, including resistivity (608, 610), neutron porosity (612, 614) and density separation (616, 618), together with the spectral ratio denoted, $S_w$, (620, 622).

The depth domain spectral ratio log (622) predicts the presence of gas deposits (120) along a wellbore path (360) by means of an anomaly in spectral ratio $\Delta S_w$ (624). The non-producing gas well (600) shows insignificant anomalies in $S_w$ (620) over the portion of measured depth displayed in FIG. 6A to indicate an absence of gas. In contrast, the producing gas well (602) shows an anomaly in $S_w$ (624) over the portion of measured depth (626) indicated between the top reservoir boundary and the base reservoir boundary at this location. This anomaly (626) predicts the presence of gas. This prediction of the presence of gas is supported by the resistivity log (610), neutron porosity log (614), and density log (618) between the top and the base reservoir boundaries.

In accordance with one or more embodiments, the spectral ratio log may be used alone to predict the presence of gas or another hydrocarbon. In accordance with other embodiments, the spectral ratio log may be used in combination with other logs, including without limitation, gamma ray logs, resistivity logs, and neutron density logs, to predict the presence of gas or another hydrocarbon.

In some embodiments, the presence of gas may be indicated by spectral ratio values above or below a threshold value. Threshold values may be defined manually or automatically based on internal or external data. In accordance with other embodiments, a spectral ratio value may be interpreted as a probability that gas may present at a location along the wellbore path. Indications of the presence of gas may be stored on non-transitory computer memory for later retrieval and used in reservoir development planning.

In accordance with one or more embodiments, a well may be planned and drilled based, at least in part, upon the indications of the presence of gas as displayed by the depth domain spectral ratio log (370). Locations where the presence of gas is indicated or where the probability of the presence of gas is elevated may be targeted by well designers. Areas of the depth domain spectral ratio log (370) where the presence of gas is not indicated or where the probability of the presence of gas is depressed may be avoided by well designers.

Figure 7:
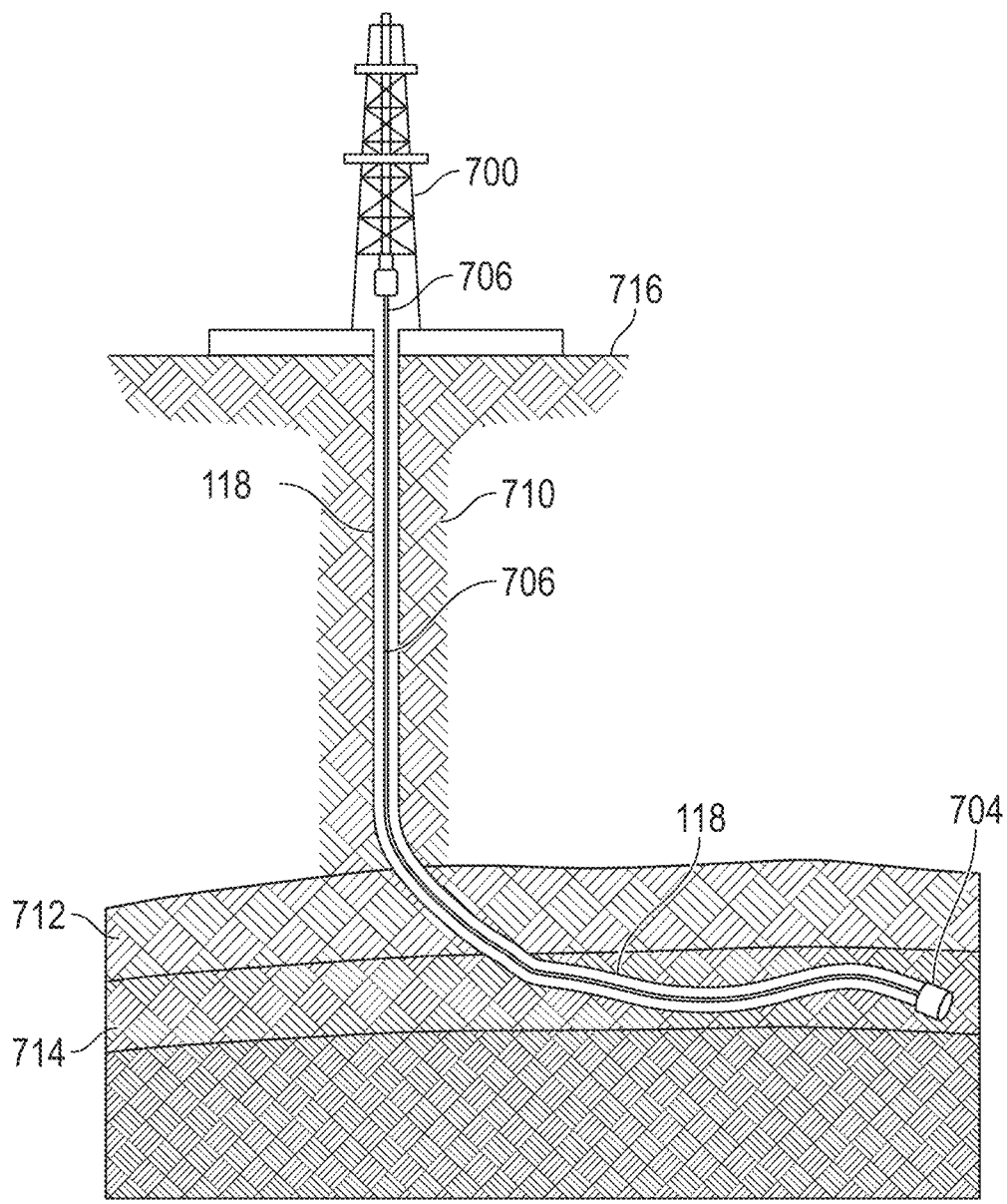
FIG. 7 shows a wellbore path pictorial in accordance with one or more embodiments.

FIG. 7 illustrates systems in accordance with one or more embodiments. The planning and drilling of a wellbore (118) may be based upon the expected presence of gas or another hydrocarbon. As shown in FIG. 7, a wellbore (118) may be drilled using a drill bit (704) attached by a drillstring (706) to a drill rig (700) located on the Earth's surface (716). The wellbore (118) may traverse a plurality of overburden layers (710) and one or more cap-rock layers (712) to a gas deposit (714). In accordance with one or more embodiments, the determination of the presence of gas or another hydrocarbon, or the expectation of an elevated probability of the presence of gas, may be used to plan and perform a curved wellbore path (118). The trajectory of the curved wellbore path (118) may be based, at least in part, on the expectation of the presence of gas.

Figure 8:
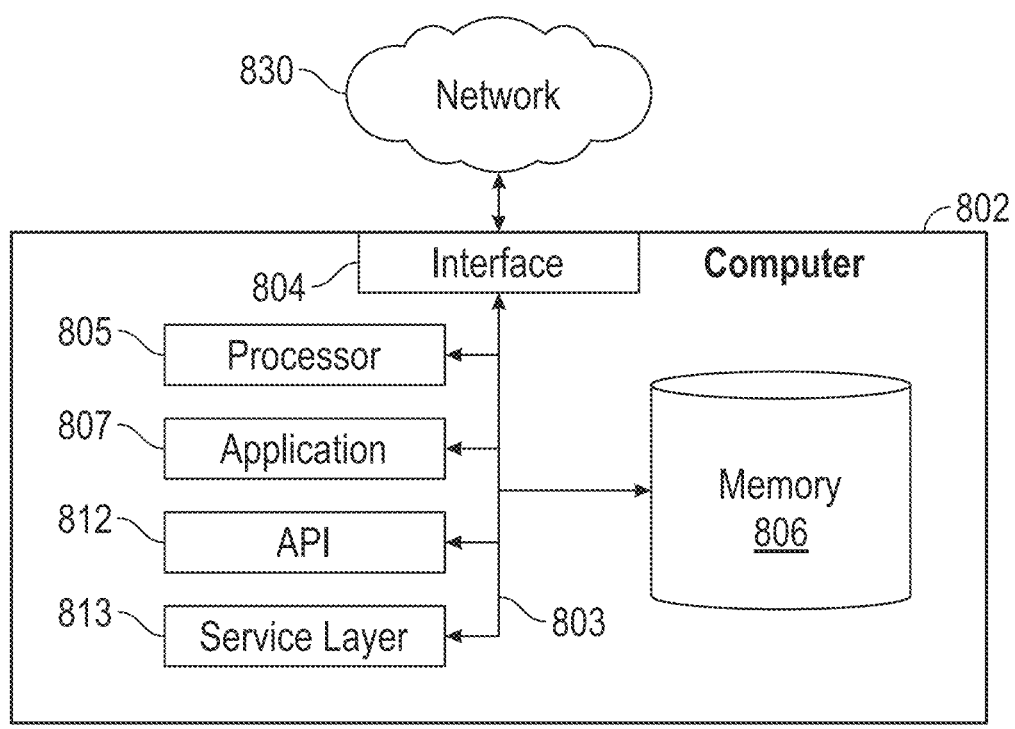
FIG. 8 shows a computer system in accordance with one or more embodiments.

Embodiments may be implemented on a computer system. FIG. 8 is a block diagram of a computer system (802) used to provide computational functionalities associated with described algorithms, methods, functions, processes, flows, and procedures as described in the instant disclosure, according to an implementation. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled to a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over a network (830) from a client application (for example, executing on another computer (802)) and responding to the received requests by processing the said requests in an appropriate software application. In addition, requests may also be sent to the computer (802) from internal users (for example, from a command console or by other appropriate access methods), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or a set of APIs. The service layer (813) provides software services to the computer (802) or other components (whether or not illustrated) that are communicably coupled to the computer (802). The functionality of the computer (802) may be accessible for all service consumers using the service layer (813). Software services, such as those provided by the service layer (813), provide reusable, defined business functionalities through a defined interface (804). For example, the interface (804) may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or implementations of the computer (802). The interface (804) is used by the computer (802) for communicating with other systems in a distributed environment that are connected to the network (830). Generally, the interface (804) includes logic encoded in software or hardware (or a combination of software and hardware) and is operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or implementations of the computer (802). Generally, the computer processor (805) executes instructions and manipulates data to perform the operations of the computer (802) and any algorithms, methods, functions, processes, flows, and/or procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or implementations of the computer (802) and the described functionality. While memory (806) is illustrated as an internal component of the computer (802), in alternative implementations, memory (806) can be external to the computer (802).

The application (807) is an algorithmic software engine providing functionality according to particular needs, desires, or implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a spectral ratio log, comprising:
   obtaining a time domain seismic image;
   obtaining a seismic velocity model;
   determining, using a computer processor, a first mono-spectral seismic image and a second mono-spectral seismic image from the time domain seismic image;
   determining, using the computer processor, a time domain spectral ratio image based, at least in part, on the first mono-spectral seismic image and the second mono-spectral image;
   transforming, using the computer processor, the time domain spectral ratio image to a depth domain spectral ratio image based, at least in part, on the seismic velocity model;
   determining a wellbore path through the depth domain spectral ratio image; and
   extracting, using the computer processor, a spectral ratio log along the wellbore path from the depth domain spectral ratio image.

2. The method of claim 1, further comprising:
   determining, using the computer processor, a well path through a subterranean region of interest using the spectral ratio log; and
   performing the well path using a drilling system.

3. The method of claim 1, wherein the time domain seismic image comprises a post-stack time migration volume.

4. The method of claim 1, wherein determining the first mono-spectral seismic image comprises applying to the time domain seismic image a transform chosen from the group consisting of a Fourier Transform, a Short-time Discrete Fourier Transform, a Gabor transform, a Stockwell Transform, a Continuous-Wavelet Transform, a Matching pursuit transform, an Empirical Mode Decomposition, a Wigner-Ville distribution, and a synchro-squeezing transform.

5. The method of claim 1, wherein a frequency of the first mono-spectral seismic image is a lower than a frequency of the second mono-spectral seismic image.

6. The system of claim 1, wherein the transforming of the time domain seismic image into the first mono-spectral seismic image comprises applying a filter to the first mono-spectral seismic image.

7. The method of claim 6, wherein the filter is selected from the group consisting of a spatial-smoothing filter, a dip-guided filter, a structure-oriented filter, a deterministic filter, and a statistical filter.

8. The method of claim 1, wherein transforming the time domain spectral ratio image to the depth domain spectral ratio image comprises:
determining a plurality of two-way travel time increments each based, at least in part, on a depth sample interval and a velocity value;
determining a two-way travel time of a depth sample point based, at least in part, on a summation of the plurality of two-way travel time increments vertically from a surface to the depth sample point; and
determining the depth domain spectral ratio image based, at least in part, on interpolating between samples in the time domain spectral ratio image to the two-way travel time of the depth sample point.

9. A non-transitory computer readable medium storing instructions executable by a computer processor, the instructions comprising functionality for:
receiving a time domain seismic image;
receiving a seismic velocity model;
determining a first mono-spectral seismic image and a second mono-spectral seismic image from the time domain seismic image;
determining a time domain spectral ratio image based, at least in part, on the first mono-spectral seismic image and the second mono-spectral seismic image;
transforming the spectral ratio image from the time domain to the depth domain based, at least in part, on the seismic velocity model;
determining a wellbore path through the depth domain spectral ratio image; and
extracting a spectral ratio log along the wellbore path from the depth domain spectral ratio image.

10. The non-transitory computer readable medium of claim 9, wherein the time domain seismic image comprises a post-stack time migration volume.

11. The non-transitory computer readable medium of claim 9, wherein determining a first mono-spectral seismic image comprises applying to the time domain seismic image a transform chosen from a group consisting of a Fourier Transform, a Short-time Discrete Fourier Transform, a Gabor transform, a Stockwell Transform, a Continuous-Wavelet Transform, a Matching pursuit transforms, an Empirical Mode Decomposition, a Wigner-Ville distribution, and a synchro-squeezing transform.

12. The non-transitory computer readable medium of claim 9, wherein the frequency of the first mono-spectral seismic image is lower than the frequency of the second mono-spectral seismic image.

13. The non-transitory computer readable medium of claim 9, wherein the time domain seismic image into a first mono-spectral seismic image, further comprises applying a filter to the first mono-spectral seismic image.

14. The non-transitory computer readable medium of claim 9, wherein transforming the spectral ratio image from the time domain to the depth domain comprises:
determining a plurality of two-way travel time increment each based, at least in part, on a depth sample interval and a velocity value;
determining a two-way travel time of a depth sample point based, at least in part, on the summation of the two-way travel time increments vertically from the surface to the depth sample point; and
determining the spectral ratio image based, at least in part, on interpolating between samples in the spectral ratio image to the two-way travel time of the depth sample.

15. A system, comprising:
a seismic acquisition system; and
a seismic processor configured to:
receive a seismic dataset;
receive a seismic velocity model;
generate a time domain seismic image from the seismic dataset;
determine a first mono-spectral seismic image and a second mono-spectral seismic image from the seismic image;
determine a spectral ratio image based, at least in part, on the first mono-spectral seismic image and the second mono-spectral seismic image;
transform the spectral ratio image from the time domain to the depth domain based, at least in part, on the seismic velocity model;
determine a wellbore path through the depth domain spectral ratio image; and
extract a spectral ratio log along the wellbore path from the depth domain spectral ratio image.

16. The system of claim 15, wherein the time domain seismic image comprises a post-stack time migration volume.

17. The system of claim 15, wherein determining a first mono-spectral seismic image comprises applying to the time domain seismic image a transform chosen from a group consisting of a Fourier Transform, a Short-time Discrete Fourier Transform, a Gabor transform, a Stockwell Transform, a Continuous-Wavelet Transform, a Matching pursuit transforms, an Empirical Mode Decomposition, a Wigner-Ville distribution, and a synchro-squeezing transform.

18. The system of claim 15, wherein the frequency of the first mono-spectral seismic image is a lower than the frequency of the second mono-spectral seismic image.

19. The system of claim 15, wherein the transforming of the time domain seismic image into a first mono-spectral seismic image, further comprises applying a filter to the first mono-spectral seismic image.

20. The system of claim 15 wherein transforming the spectral ratio image from the time domain to the depth domain comprises:
determining a plurality of two-way travel time increment each based, at least in part, on a depth sample interval and a velocity value;
determining a two-way travel time of a depth sample point based, at least in part, on the summation of the two-way travel time increments vertically from the surface to the depth sample point; and determining the spectral ratio image based, at least in part, on interpolating between samples in the spectral ratio image to the two-way travel time of the depth sample.

\* \* \* \* \*